UNITED STATES PATENT OFFICE.

KARL LOUIS FELIX FRIEDEMANN, OF STOCKHOLM, SWEDEN.

PROCESS OF PRESERVING WOOD.

1,006,077. Specification of Letters Patent. Patented Oct. 17, 1911.

No Drawing. Original application filed May 12, 1910, Serial No. 561,172. Divided and this application filed June 14, 1911. Serial No. 633,135.

*To all whom it may concern:*

Be it known that I, KARL LOUIS FELIX FRIEDEMANN, a citizen of the Kingdom of Sweden, residing at Stockholm, Sweden, have invented a new and useful Improved Process of Preserving Wood, of which the following is a specification.

This invention relates to a process of preserving wood, which constitutes an improvement of another process of preserving wood described in the U. S. Patent No. 937,802 of October 26, 1909, granted to me and Werther A. G. von Heidenstam as joint inventors.

The present application is a division of my U. S. patent application Serial No. 561,172 filed May 12, 1910.

By the process described in the U. S. Patent No. 937,802 a layer of carbonate of lime is formed in the outer layers of the wood, which prevents in a certain degree washing out and decomposition of the impregnating substance.

The object of the present invention is to provide a more reliable protection against washing out and decomposition of the impregnating substance than that afforded by the layer of carbonate of lime alone.

The invention consists in impregnating the wood with solutions of combinations of phenols with alkaline earths and an oil in emulsion with said solutions.

The invention may be carried into practice for instance in the following manner. The wood is placed in a usual impregnation vessel or apparatus in which is introduced for instance a water solution of calcium cresate and an oil for instance creosote oil in emulsion therewith. The salt solution may contain about 4–5% of calcium cresate and to each cubic foot of wood may be employed about one and one-third gallons of the solution. The quantity of oil in relation to the quantity of salt solution may be chosen at will. Generally it is suitable to use 1 volume of oil on 3 volumes of the salt solution. The mixture of salt solution and oil may be forced into the wood in the usual manner by pressure. Inasmuch as the salt solution permeates the pores of the wood easier than the oil, the latter will so to say be filtered from the salt solution in the outer layers of the wood in which thus is obtained an oil layer which retains the salt in the wood and also protects the same from chemical alterations such as oxidation and decomposition. When the wood thus impregnated is exposed to the influence of the atmospheric air the phenols in the outermost layers of the wood will gradually be freed by the carbonic acid contained in the air. The carbonate of lime formed thereby constitutes a further protection against washing out and decomposition of the calcium cresate in the inner parts of the wood.

I am aware that it has been proposed to use mixtures of an oil and one or more preserving substances such as sulfate of copper, slaked lime, and so on for preserving wood and I therefore do not claim the use of an oil in connection with another preserving substance broadly but

What I claim is:

The process of preserving wood which consists in impregnating the wood with solutions of combinations of phenols with alkaline earths and an oil in emulsion with said solutions, substantially as and for the purpose set forth.

In testimony that I claim the foregoing as my invention, I have signed my name in presence of two subscribing witnesses.

KARL LOUIS FELIX FRIEDEMANN

Witnesses:
CHARLES SCHUMAN,
ELLEN FORCIO.